United States Patent [19]
Martini

[11] Patent Number: 5,219,169
[45] Date of Patent: Jun. 15, 1993

[54] GOLF CLUB INCLUDING STRIKING FACE INCLINATION COMPENSATOR

[76] Inventor: Rex L. Martini, 328 Powdermill Rd., Belleville, Ill. 62223

[21] Appl. No.: 880,566

[22] Filed: May 8, 1992

[51] Int. Cl.⁵ .............. A63B 69/36; A63B 53/08; G01C 9/28; B23B 45/14
[52] U.S. Cl. .............. 273/162 B; 273/187.4; 273/79; 33/334; 33/387
[58] Field of Search .............. 273/162 B, 187.4, 186.2, 273/193 R, 194 A, 194 B, 187.6, 79; 33/379, 334, 333, 387

[56] References Cited

U.S. PATENT DOCUMENTS

| | | | |
|---|---|---|---|
| 3,306,618 | 2/1967 | Liljequist | 273/162 B |
| 3,664,032 | 5/1972 | Tompkins | 33/334 |
| 4,079,520 | 3/1978 | Davis | 273/162 B X |
| 4,141,151 | 2/1979 | Jansky | 33/334 |
| 4,211,415 | 7/1980 | Lindo | 273/162 B |
| 4,457,078 | 7/1984 | Suchy | 33/334 |
| 4,482,155 | 11/1984 | Higley | 273/162 B |
| 4,934,706 | 6/1990 | Marshall | 273/183 D |

*Primary Examiner*—George J. Marlo
*Attorney, Agent, or Firm*—Kalish & Gilster

[57] ABSTRACT

A golf club orientation and alignment system for use when addressing and hitting a golf ball. A bubble indicator is carried at the top surface of a club head and can be adjusted to compensate for different club face offsets. The bubble indicator shows the alignment and orientation of the club head about both a line-of-aim axis and a transverse axis perpendicular to the line-of-aim axis. When the club head is aligned and oriented in this manner, a golfer can shoot more accurately, and eliminate hooks and slices. Arrangement is disclosed also for controllably adjusting the bubble indicator for varying the inclination of a hitting face of the club.

7 Claims, 3 Drawing Sheets

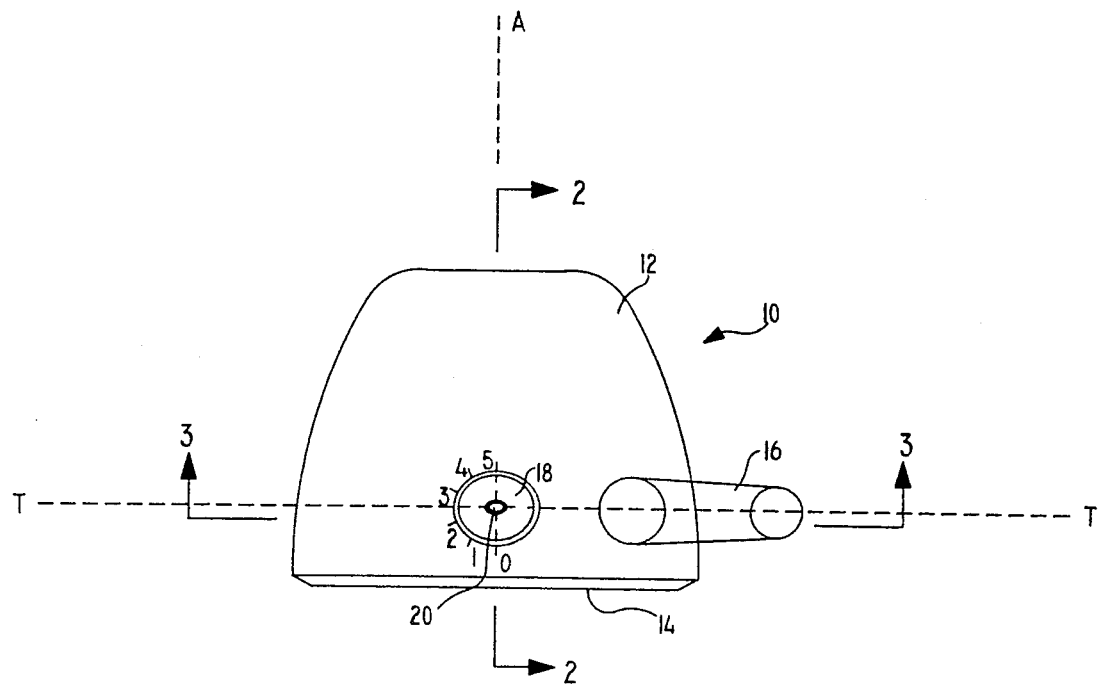
FIG. 1
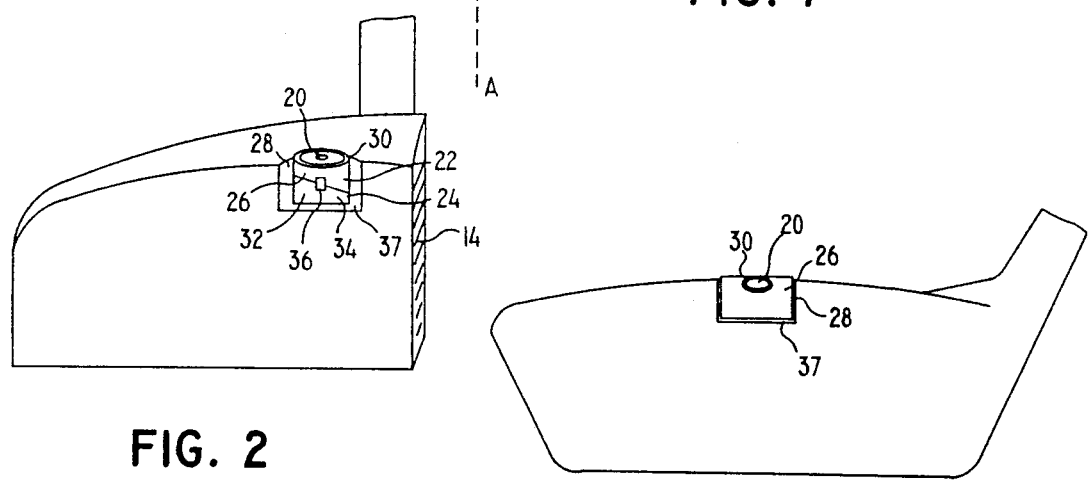
FIG. 2
FIG. 3
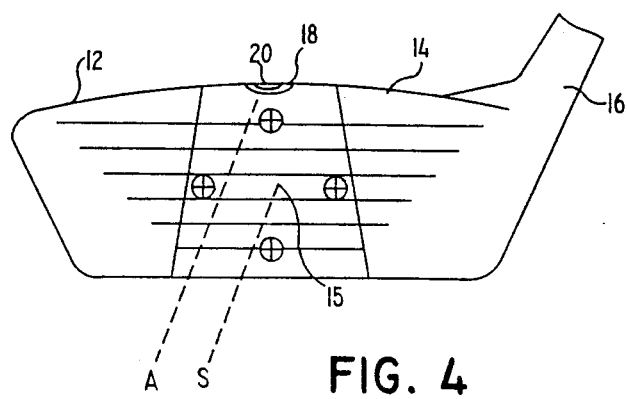
FIG. 4

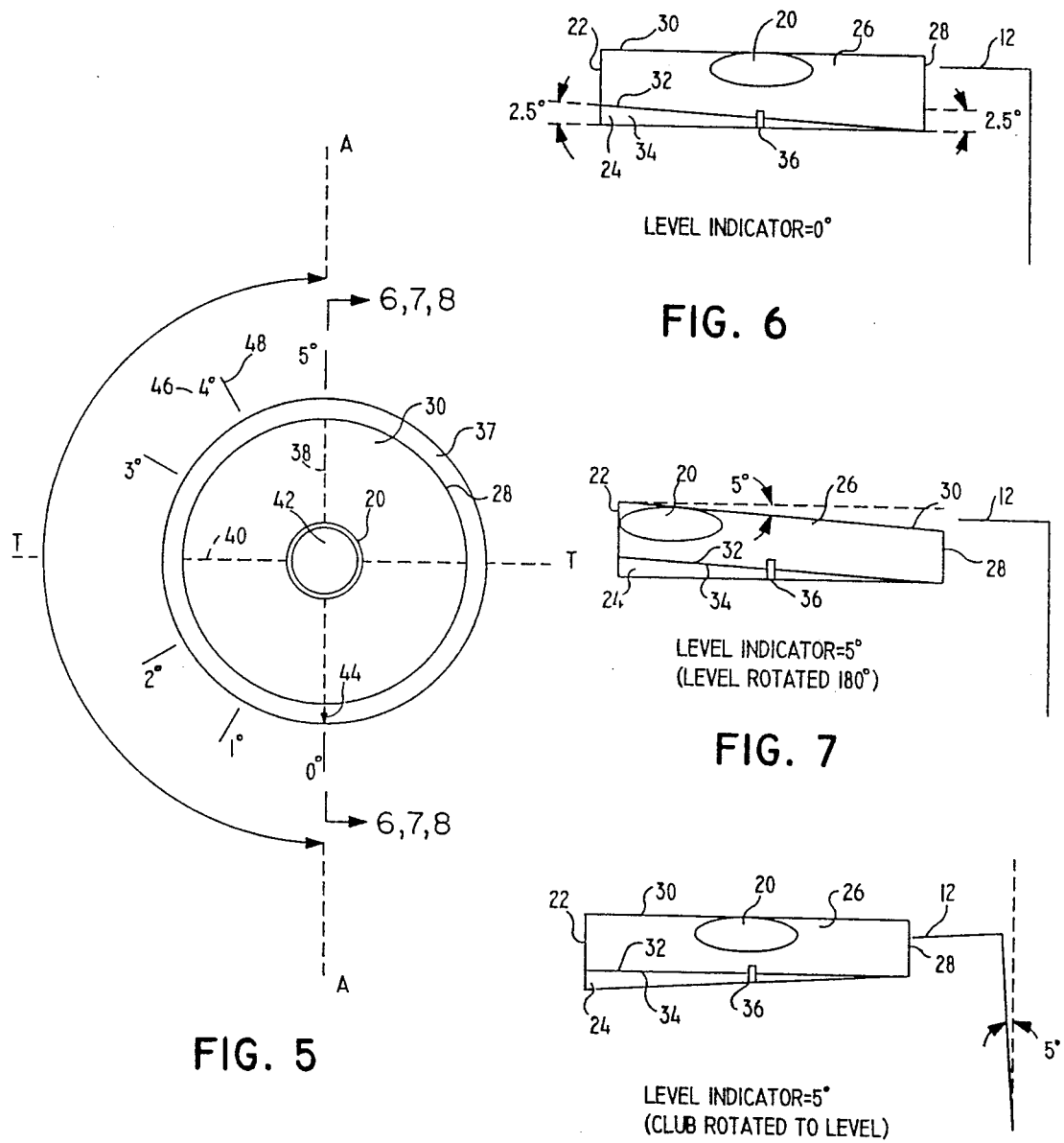

GOLF CLUB INCLUDING STRIKING FACE INCLINATION COMPENSATOR

BACKGROUND OF THE INVENTION

1. Field of the Invention

This invention relates generally to golf clubs, and more particularly, to a golf club orientation and alignment system for use when addressing and hitting a golf ball with a golf club.

2. Description of Prior Art

Heretofore, various types of position indicators have been developed to keep a golf club properly aligned with a golf ball and the preferred line-of-aim. Most of these position indicators use bubble levels which indicate the proper alignment when the bubble is in the center of a circle drawn on the outer surface of the position indicator. This proper alignment indicates the club is level with respect to two axes, one parallel to the line-of-aim and one transverse to the same. However, none of these indicators are placed on or close to the head of the golf club, which of course is the part of the club that one most needs to properly align. Instead, these prior indicators are placed at or near the handle end of a golf club shaft. This means that a small alignment error at the handle end translates into a bigger error at the club head end, and results in an inaccurate shot.

For example, the Davis U.S. Pat. No. 4,079,520, which was issued in 1978, discloses a bubble indicator which attached to a club immediately below the handle. In 1980, the Lindo U.S. Pat. No. 4,211,415 disclosed a level indicator which could be placed on folding guide ribs attached along a golf club shaft. Finally, the Higley U.S. Pat. No. 4,482,155, issued in 1984, reveals a bubble level indicator attached to the end of the handle grip at the end of a golf club.

None of the above patents solves the problem of having the position indicator too far away from the club head for accurate alignment. Further, none of the above patents easily adjusts to compensate for the different offset angles of individual club faces. For example, the Lindo patent does not disclose any type of adjustable feature. In the Davis patent, on the other hand, one may adjust the position indicator only by trial and error, i.e., by taking a number of test swings or real shots. Finally, in the Higley patent, one adjusts the club itself so that the bubble is aligned at the intersection of two or more ,of a vast number of lines on the indicator.

The present invention solves this problem. A composite position bubble indicator has an upper section with a sloped or beveled bottom surface which sits on top of an oppositely sloped or beveled top surface of a lower section when the indicator points towards 0°. As the indicator is turned to a position greater than 0°, the two surfaces interact in such a way as to cause the indicator itself to become sloped. One then adjusts the club head so that the bubble on the indicator falls within the center circle. In this way, the position indicator on each club can be adjusted to the offset angle of each individual club hitting face so that one can position the club head properly for an accurate shot.

SUMMARY OF THE INVENTION

Therefore, it is an object of the present invention to provide a golf club orientation and alignment system which enables a golfer to make more accurate shots.

Another object of the present invention is to provide a golf club orientation and alignment system which eliminates hooks and slices.

It is a further object of the present invention to provide a golf club orientation and alignment system which enables one to properly align a golf club head with a golf ball and the required line-of-aim.

It is yet another object of the present invention to provide a golf club orientation and alignment system which enables one to properly orient a golf club head with respect to a transverse axis perpendicular to the line-of-aim.

It is a still further object of the present invention to provide a golf club orientation and alignment system which easily adjusts to the offset angle of each individual club hitting face.

It is another object of the present invention to provide a golf club orientation and alignment system which is permanently mounted on individual golf clubs thereby eliminating time-consuming transfers and adjustments between different clubs.

It is yet another object of the present invention to provide a golf club orientation and alignment system which quickly helps a golfer orient and align a golf club in a proper manner.

With those objects in mind, the present invention embodies a golf club orientation and alignment system for use when addressing and hitting a golf ball with a golf club. A bubble indicator is carried at the top surface of a club head, near a hitting face edge of the club head, in predetermined alignment with a line-of-aim extending through a point of desired impact on a hitting face of the club head. The bubble indicator shows the orientation of the club head about axes respectively extending along a line-of-aim and extending transverse to the line-of-aim. The user of the golf club may accurately orient the club head and align it for hitting the ball for a more accurate shot. The bubble indicator also intrinsically defines a predetermined inclined orientation of the hitting face relative to level when addressing the ball.

As an additional, optional aspect, the present invention may include means for controllably adjusting the bubble indicator to selectively vary the predetermined orientation of the hitting face comprising an indicator placed within a club head cavity, where the indicator further comprises an indicator upper section with a sloped or beveled bottom surface, an indicator lower section with a section sloped or beveled top surface and a pin connecting the two surfaces. The indicator upper section may be rotated about the pin changing the slope of the bubble indicator itself relative to the top surface of the club head. When the bubble indicator indicates level, the hitting face will be varied to the required predetermined orientation.

Other objects, features and advantages of the present invention will become apparent to one skilled in the art from the description, drawings and claims detailed hereinbelow.

BRIEF DESCRIPTION OF THE DRAWINGS

FIG. 1 is a top plan view of a golf club head illustrating the present invention mounted on top of a club head.

FIG. 2 is a side sectional view of FIG. 1 taken along the line 2—2.

FIG. 3 is front sectional view of FIG. 1 taken along line 3—3.

FIG. 4 is a front elevational view of FIG. 1 showing the hitting face of the club head.

FIG. 5 is an enlarged schematic top view of the golf club orientation and alignment system.

FIG. 6 is a sectional view of FIG. 5 taken along line 6—6 when the golf club orientation and alignment system is set at 0°.

FIG. 7 is a sectional view of FIG. 5 taken along line 7—7 when the golf club orientation and alignment system is set at 5° and the hitting face is left in the vertical position.

FIG. 8 is a sectional view of FIG. 5 taken along line 8—8 when the golf club orientation and alignment system is set at 5° and the hitting face is offset 5° from vertical.

DESCRIPTION OF THE PREFERRED EMBODIMENT

Figure 9:
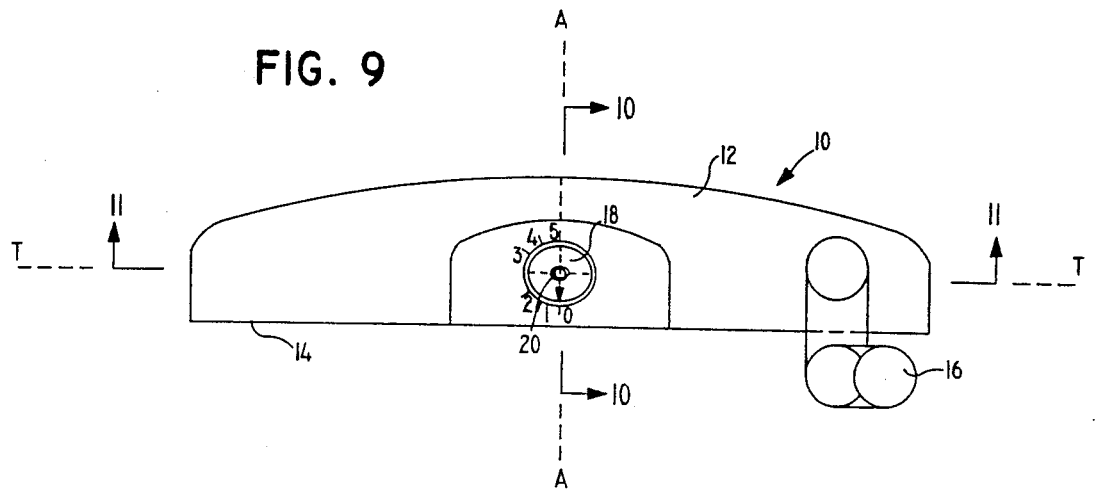
FIG. 9 is a top plan view of a golf club head illustrating the present invention mounted on top of a club head.

Referring now by reference characters to the drawings which illustrate the preferred embodiment of the present invention, 10 generally indicates a golf club head comprising a top surface 12, a hitting face 14 and a usual club shaft 16, as shown in FIG. 1. A bubble indicator 18 is embedded in a club head cavity 30 in top surface 12 of golf club head 10, as shown in FIGS. 2 and 3, although it should be noted that bubble indicator 18 could be mounted on top of top surface 12 rather than being embedded.

As can be seen in FIG. 1, bubble indicator 18 is positioned near hitting face 14, substantially forward of the center point of top surface 12, at the intersection of two axes. Line-of-aim axis A runs perpendicular to hitting face 14, in a plane which runs through a sweet spot 15 (shown in FIG. 4) and the center of bubble indicator 18, representing the proper line-of-aim. Sweet spot 15 refers to the point on hitting face 14 which is at the center of the most desirous spot to hit a golf ball for the best and most accurate shot possible. A transverse axis T runs parallel to hitting face 14, perpendicular to a line-of-aim axis A, in a plane which runs through the middle of club shaft 16 and the center of bubble indicator 18. Because of the unique positioning of bubble indicator 18, a golfer can look down club shaft 16 and use bubble indicator 18 as a bulls-eye target. When a bubble 20 is located at the intersection of line-of-aim axis A and transverse axis T, the club head is properly oriented and aligned for a more accurate shot.

FIG. 2 is a side sectional view of FIG. 1 taken in the plane of line-of-aim axis A. FIG. 3 is a front section view taken in the plane of transverse axis T. By reference to FIGS. 2 and 3, bubble indicator 18 comprises an indicator upper section 22 and an indicator lower section 24. Indicator upper section 22 comprises bubble 20 in a transparent fluid 26, both of which are contained within a transparent indicator upper section outer surface 28. Transparent fluid 26 can comprise almost any type of fluid while bubble 20 can comprise almost any type of gas or fluid as long as it is lighter than transparent fluid 26. An indicator plane 30 forms the top portion of transparent indicator upper section outer surface 28 while an indicator upper section sloped or beveled bottom surface 32 forms the bottom portion of transparent indicator upper section outer surface 28. Indicator lower section 24 may be seated in club head cavity 37 by the use of a hardenable resin or substance and comprises an indicator lower section sloped or beveled top surface 34 which is connected to indicator upper section sloped or beveled bottom surface 32 by pin 36. This bevel arrangement allows indicator upper section 22 to rotate a full 180° in relation to indicator lower section 24 and golf club head 10. It should be noted that use of the present bevel arrangement disclosed herein also comprehends inclusion of other types of bevel designs including a single section bubble indicator with an indicator sloped or beveled bottom surface which is connected by pin 36 to a cavity sloped or beveled bottom surface, whereby the single section bubble indicator could rotate 180° in relation to the cavity sloped or beveled bottom surface.

FIG. 4 shows a front view of hitting face 14 of the golf club head 10. This figure shows a sweet spot axis S which runs through sweet spot 15, in the same plane and parallel to line-of-aim axis A which runs through bubble indicator 18. Thus, when bubble indicator 18 is properly aligned along line-of-aim axis A, sweet spot axis S will also be properly aligned in the same line-of-aim plane. In this way, a golf ball can be more accurately hit with hitting face 14 specifically, and golf club head 10 generally, when using bubble indicator 18 to properly align sweet spot 15 on hitting face 14 with a golf ball.

FIG. 5 shows a top view of indicator plane 30 comprising a first dashed indicator line 38, a second dashed indicator line 40 and a circle 42 which is drawn at the intersection of the two lines 38 and 40. Further, an arrowhead 44 is placed on the end of first indicator line 38. Also, hitting face offset degree numbers 46 and hitting face offset degree lines 48 are printed on top surface 12 of club head 10 around the circle formed by the upper opening of club head cavity 37.

Thus, as shown and described, indicator plane 30 will be slightly elevated above top surface 12 of club head 10, and bubble 20 will be within circle 42 when arrowhead 44 is lined up with a hitting face offset degree number, as designated by reference character 46, and a hitting face offset degree line 48 which is marked "0'" and hitting face 14 is vertical (FIGS. 5 and 6). In addition, at this setting first indicator line 38 coincides with line-of-aim line A while second indicator line 40 coincides with transverse line T in this position.

Figure 10:
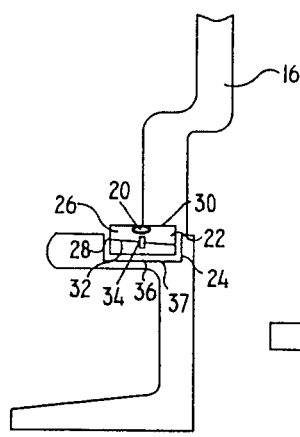
FIG. 10 is a side sectional view of FIG. 9 taken along the line 10—10.
Figure 11:
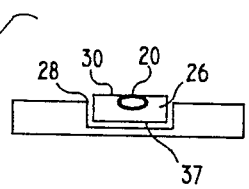
FIG. 11 is a front sectional view of FIG. 9 taken along line 11—11.

As shown in FIG. 6, both indicator upper section sloped or beveled bottom surface 32 and indicator lower section sloped or beveled top surface 34 are inclined forward towards hitting face 14 at an angle of 2.5°. The 2.5° slope in the figures was chosen for illustration purposes only, and in fact, may be much higher so as to be useable on all types of clubs including pitching wedges which may have hitting face offsets of greater than 40°. Bubble indicator 18 is intended to be used in all types of clubs generally including woods, irons, pitching wedges or even putters as illustrated in FIGS. 9, 10 and 11.

In reference to the current illustrations and FIG. 7 specifically, when using a golf club with a hitting face offset of 5°, indicator plane 30 is rotated 180° about a vertical axis so that arrowhead 44 is aligned with hitting face offset degree number 46 and hitting face offset degree line 48 labelled "5°". In this configuration, club head 10 will be properly oriented and aligned if hitting face 14 is also rotated so that hitting face 14 is 5° offset from vertical as shown in FIG. 8. Proper orientation and alignment in this configuration is indicated when bubble 20 is within circle 42 (FIG. 8). Of course, arrowhead 44 may be aligned with any of the hitting face offset degree numbers 46 and hitting face offset degree lines 48 in between the 0° and the maximum setting on club head top surface 12 to adjust for any hitting face offset.

Figure 12:
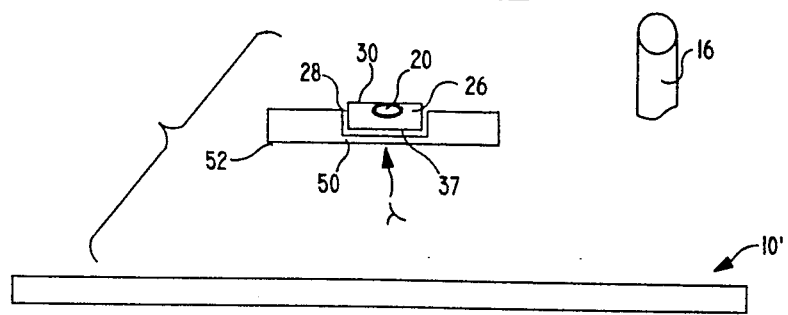
FIG. 12 is a view like FIG. 11 showing a modified version of a putter employing the invention.

FIG. 12 shows a modified version of a putter 10' wherein the cavity 37 opens downwardly at 50 through a flange 52 to allow natural light to illuminate the fluid with the bubble indicator, which then appears brighter so that it is easier to see.

For some irons and putters it may be advantageous to locate the bubble indicator to be rearwardly offset from the axis of elongation although remaining aligned with the sweet spot and line-of-impact.

In view of the foregoing, it will be seen that the several objects of the invention are achieved and other advantages are attained.

Although the foregoing includes a description of the best mode contemplated for carrying out the invention, various modifications are contemplated. For example, the bubble indicator within the club head may be fixed at some predetermined setting as a function of the club head orientation relative to its shaft and line-of-aim axis. Thus it may be so set into a flange integral with the club head.

As various modifications could be made in the construction herein described and illustrated without departing from the scope of the invention, it is intended that all matter contained in the foregoing description or shown in the accompanying drawings shall be interpreted as illustrative rather than limiting.

What is claimed is:

1. A golf club including a head for providing user orientation and alignment to compensate for different club face inclinations when addressing and hitting a golf ball with the club, a bubble indicator carried at the top surface of the head, the bubble indicator positioned near a hitting face edge of the head, in predetermined alignment with a line-of-aim extending through a point of desired impact on a hitting face of the head, the bubble indicator showing orientation of the head about axes respectively extending along a line-of-aim and extending transverse to the line-of-aim, and means for adjusting the bubble indicator to selectively vary the predetermined inclination of the hitting face relative to a level position as indicated by the bubble indicator, whereby the user of the club may accurately orient the head and align it for hitting the ball for a more accurate shot.

2. A golf club according to claim 1 wherein the head defines a bubble indicator cavity, and wherein the means for adjusting the bubble indicator including an indicator body within such cavity having a transparent fluid defining a bubble and an indicator surface over the bubble for intrinsically defining a predetermined inclined orientation of the hitting face relative to level when the bubble is positioned at a specific location below the indicator surface, and means for selectively establishing the angular orientation of the bubble-carrying body within the cavity with respect to a vertical axis of the cavity.

3. A golf club according to claim 2 wherein the indicator body comprises an upper section and lower section, the upper section being rotatable relative to the lower section about said vertical axis for changing the angular orientation with respect to said vertical axis.

4. A golf club according to claim 2 wherein the indicator body has a lower surface which is sloped or bevelled, the indicator body being rotatable upon said lower surface about said vertical axis for thereby changing the angular orientation with respect to said vertical axis.

5. A golf club according to claim 4 wherein the bubble indicator body is rotatable about a pin in said cavity.

6. A golf club according to claim 3 wherein the indicator body upper and lower sections have surfaces in mutual contact, which surfaces are sloped or bevelled.

7. A golf club including a head for providing user orientation and alignment to compensate for different club face inclinations when addressing and hitting a golf ball with the club, the head including cavity defining means for carrying a bubble indicator for user visibility above the top surface of the head, the bubble indicator being positioned in relative proximity to a hitting face edge of the head, and in predetermined alignment with a line-of-aim extending through a point of desired impact on a hitting face of the head, the bubble indicator showing orientation of the head about axes respectively extending along a line-of-aim and extending transverse to the line-of-aim, and the bubble indicator including an indicator body within such cavity having a transparent fluid defining a bubble and an indicator surface over the bubble for intrinsically defining a predetermined inclined orientation of the hitting face relative to level when the bubble in is positioned at a specific location below the indicator surface, and means for selectively establishing the angular orientation of the bubble-carrying body within the cavity with respect to a vertical axis of the cavity, the bubble indicator being thereby adjustable to selectively vary the predetermined inclination of the hitting face relative to a level position as indicated by the bubble indicator, whereby the user of the club may accurately orient the head and align it for hitting the ball for a more accurate shot.

* * * * *